United States Patent [19]
Sim

[11] Patent Number: 5,611,475
[45] Date of Patent: Mar. 18, 1997

[54] SOLDERING APPARATUS

[75] Inventor: Ah T. Sim, Singapore, Singapore

[73] Assignee: Sun Industrial Coatings Private Ltd., Jurong, Singapore

[21] Appl. No.: 658,691

[22] Filed: Feb. 21, 1991

Related U.S. Application Data

[63] Continuation-in-part of Ser. No. 357,633, May 24, 1989, abandoned, which is a continuation of Ser. No. 72,037, Jul. 10, 1987, abandoned.

[30] Foreign Application Priority Data

Jul. 11, 1986 [GB] United Kingdom ................... 8616939

[51] Int. Cl.$^6$ ......................... H05K 3/34; B23K 37/047
[52] U.S. Cl. ............... 228/40; 228/43; 118/423; 118/428
[58] Field of Search ................ 228/180.1, 180.2, 228/37, 40, 43, 47, 56.1, 254; 118/423, 425, 428; 198/390, 465.1, 465.2; 427/436, 123

[56] References Cited

U.S. PATENT DOCUMENTS

| | | | |
|---|---|---|---|
| 4,285,457 | 8/1981 | Kondo | 228/36 |
| 4,311,265 | 1/1982 | Kondo | 228/40 |
| 4,489,923 | 12/1984 | Barresi et al. | 228/254 |
| 4,677,937 | 7/1987 | Tee | 118/500 |
| 4,700,935 | 10/1987 | Winslow et al. | 228/254 |
| 4,717,064 | 1/1988 | Popielarski et al. | 228/37 |
| 4,787,550 | 11/1988 | Masuda et al. | 228/254 |
| 4,964,560 | 10/1990 | Wharff | 228/254 |
| 5,130,164 | 7/1992 | Hutchison et al. | 228/254 |

FOREIGN PATENT DOCUMENTS

| | | |
|---|---|---|
| 2121993 | 12/1972 | Germany. |
| 53-62759 | 6/1978 | Japan. |
| 57-148878 | 9/1982 | Japan. |
| 58-53183 | 4/1983 | Japan. |
| 61-7063 | 1/1986 | Japan. |
| 2036625 | 7/1980 | United Kingdom. |

Primary Examiner—Samuel M. Heinrich
Attorney, Agent, or Firm—Bacon & Thomas

[57] ABSTRACT

Apparatus for applying solder to electrical or electronic components mounted in a horizontally oriented carrier, includes a solder bath, a pair of tracks (1,2) for guiding the carrier across the solder bath, and a device for urging the carrier along the tracks. The track has a first profiled region (12,19) for guiding a leading position of the carrier down towards the surface of the solder, and a second profiled region (16,20) longitudinally spaced from the first region, and laterally offset, for simultaneously guiding a trailing portion of the carrier down towards the surface of the solder, the profiles being substantially the same so that the carrier maintains its horizontal orientation while being moved vertically towards and away from the surface of the solder. The carrier moves on follower wheels which run along the tracks.

9 Claims, 2 Drawing Sheets

SOLDERING APPARATUS

This application is a CIP of U.S. patent application Ser. No. 07/357,633 filed on May 24, 1989 now abandoned, which is a Continuation of U.S. patent application Ser. No. 07/072,037 filed Jul. 10, 1987, now abandoned.

BACKGROUND OF THE INVENTION

This invention relates to soldering apparatus and is particularly concerned with systems in which components to be coated with solder are passed through a bath of solder. The invention is particularly, but by no means exclusively, concerned with applying solder to the leads of integrated circuit packs such as dual-in-line (DIP), SOIC or other types.

Frequently, such coating is carried out in a wave soldering system. In such a system a carrier for the components may be passed over a bath of solder in which a standing wave if formed. The arrangement is such that the component portions to be coated pass through the peak of the standing wave of solder as the carrier is moved over the bath.

A problem with certain known systems is that it is difficult to control the quality of the coating, particularly as regards an even thickness. Frequently, package leads have regions where the coating is significantly thicker than elsewhere. Another problem is that of accommodating various different types of components which may be handled, particularly as regards the depth of immersion in the wave of solder. For example, a DIP may require immersion to a depth of 6 mm whereas an SOIC—designed for surface mounting on a circuit board—may require a depth of e.g. only 1.2 mm. To cope with such a range of depths it may be necessary to change the wave height or even to use separate apparatus dedicated to the individual components.

There had been proposed a system for dipping individual carriers vertically into and removing them vertically out of a bath of solder. This provides an improvement in quality over wave soldering apparatus but has the disadvantage of being considerably slower since carriers cannot be processed continuously.

There is thus a need for a system which will achieve some of the benefits of both wave soldering and dip soldering so as to provide both reasonable quality and reasonable speed of operation, and preferably greater versatility.

SUMMARY OF THE INVENTION

Viewed from one broad aspect, there is disclosed herein an apparatus for applying solder to electrical or electronic components mounted in a horizontally oriented carrier, including a solder bath, a track for guiding the carrier across the solder bath, and means for urging the carrier along the track, wherein the track has a first profiled region for guiding a leading portion of the carrier down towards the surface of the solder, and a second profiled region longitudinally spaced form the first region for simultaneously guiding a trailing portion of the carrier down towards the surface of the solder, the profiles being substantially the same so that the carrier maintains its horizontal orientation while being moved vertically towards and away from the surface of the solder.

With such an arrangement, the components are subjected to vertical dipping but at the same time are moved across the bath. By using a number of carriers on the track, one after the other, continuous operation can be achieved. The vertical dipping gives better quality coating, the speed and depth of descent can be determined by the profiles in the specific regions of the track.

The significance of having separate, spaced profiled regions for the leading and trailing portion of the carrier, is that it is maintained in a horizontal orientation while being dipped and moved across the bath of solder. If there was only one profiled region which the leading and trailing edges followed in series, then the carrier would be inclined as it moved towards and away from the surface of the solder. This would produce uneven and poorer quality coating.

Normally, the carrier would be guided by a track on each side, each track having the profiled regions described above, which would of course be aligned.

The profile in each profiled region will generally consist of a downwardly inclined region, a horizontal region, and an upwardly inclined region. The inclination of the inclined regions determines the rate of descent and ascent, and one rate could be greater than the other if desired. The inclined regions could be flat or have a more complex profile so as to provide a variable rate of descent and/or ascent.

The two profiled regions on a track can be offset laterally, with corresponding followers supporting the leading and trailing portions of the carrier being likewise laterally displaced with respect to each other. Thus, the leading follower will bypass one region and continue on a flat portion of track until it reaches its associated profiled region. At this point the trailing follower will reach its associated profiled region. After the dipping operation, the trailing follower will bypass the next profiled region, continuing on a flat portion of track.

The followers may, for example, be in the form of wheels, rollers, non-rotatable but low friction elements, or the like. The followers may be integral with the carrier, or attachable to the carrier, or part of a movable support for the carrier.

The carrier itself may be of any suitable type, for example, of the type shown in U.S. Pat. No. 4,677,937 although it may be modified if necessary so as to operate in the apparatus described herein.

Thus the carrier may include a plurality of tracks in which the electrical components are removably mounted. After the leads of the components have been coated with solder the components can be removed from the tracks of the carrier for subsequent use, such as mounting on a printed circuit board, possibly after a period of storage.

The means for urging the carriers along the track can be in any suitable form but one preferred embodiment comprises a chain conveyor with a plurality of fingers for engagement with a the carrier. The carrier may be provided with a notch for receiving the finger. The finger should have a sufficient vertical extent to remain in contact with the carrier during the dipping operation. Alternatively, the carrier could have a portion of sufficient vertical extent to remain in contact with a shallower finger or like member.

It is most advantageous if the profiled regions are readily replaceable. In this way it is easy to adapt the apparatus for different components by altering the rate and depth of descent and ascent as well as the total time of immersion. Each profiled region could be provided on a separate replaceable member but preferably the associated pair of regions is provided on a single replaceable member such as a block. This provides considerable advantages over a wave soldering system in which the height of the wave has be to altered.

BRIEF DESCRIPTION OF THE DRAWINGS

An embodiment of an apparatus exemplifying some of the above-mentioned and other features and broad aspects will now be described by way of example only and with reference to the accompanying diagrammatic drawings in which.

DETAILED DESCRIPTION OF THE PREFERRED EMBODIMENT

Figure 1:
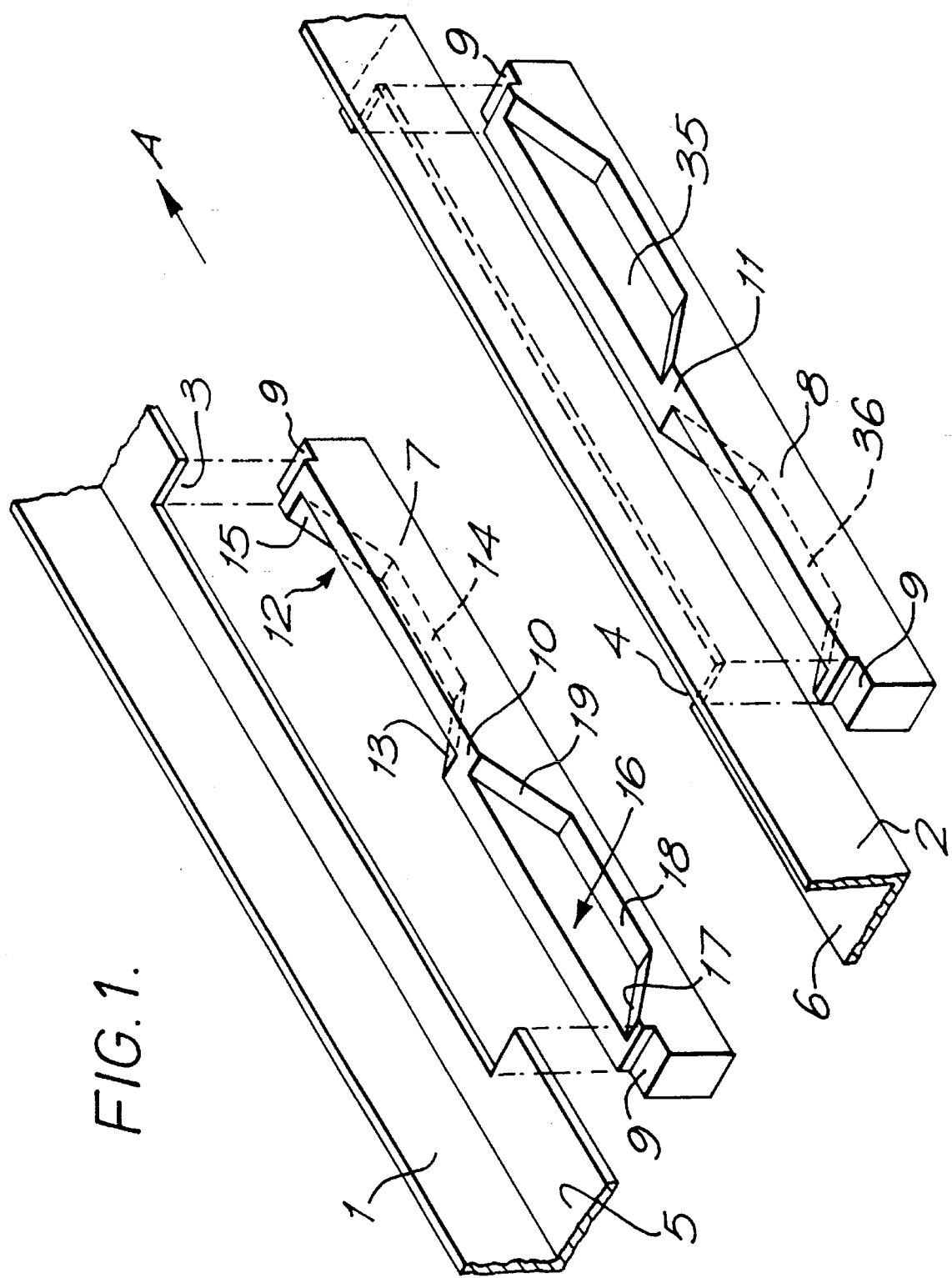
FIG. 1 is a perspective, exploded view of guide tracks for use in the apparatus.

Referring now in detail to the drawings, in FIG. 1 there is shown a left hand guide track 1 in the form of an "L"-section angle bar, and a corresponding right hand guide track 2 also in the form of an "L"-section angle bar. On the apparatus, the tracks 1 and 2 will be arranged parallel to guide a carrier in the direction of arrow A. The tracks 1 and 2 have aligned cut-outs 3 and 4 on the lower guide surfaces 5 and 6 adapted to receive profiled blocks 7 and 8 respectively. These blocks are to be located releasably in the cut-outs by suitable means so that they can be changed to provide different profiles. The blocks are recessed as shown at 9 so that when received in the cut-outs 3 and 4 their upper surfaces 10 and 11 respectively will be flush with surfaces 5 and 6 of the tracks 1 and 2.

Referring to block 7, it has a leading profiled region 12 formed in the left hand or outer part of the leading end of the block. This profiled region consists of a downwardly inclined ramp 13 descending from the upper surface 10, a horizontally extending portion 14 and upwardly inclined ramp 15 leading back up to the upper surface 10. The width of the region is approximately one half of the width of the block 7.

The block 7 also has a trailing profiled region 16 formed in the right hand or upper part of the trailing end of the block, again having a width of approximately one half the width of the block 7. This trailing profiled region 16 is thus laterally offset from the leading profiled region and has a profile identical in shape and dimensions to that of leading profiled region 12, with a downwardly inclined ramp 17, a horizontal portion 18 and an upwardly inclined ramp 19.

The spacing between the start of ramp 17 and the start of ramp 13, and thus the spacing between all other corresponding parts of the profiled regions, is equal to the spacing between leading and trailing followers which will support a carrier and follow the leading and trailing profiles respectively. Thus, assuming that the carrier is horizontal as the followers move along the level surface 5 of track 1, then it will remain horizontal as the followers pass through the profiled regions although it will be lowered and raised in accordance with the profiles.

The right hand block 8 is art exact mirror image of block 7, with profiled regions 19 and 20 being mirror images of regions 12 and 16 respectively with identical profiles. The block 7 and 8 are longitudinally aligned on the tracks 1 and 2. Thus right hand followers, aligned with left hand followers, will follow the profile at the same time and ensure that a supported carrier is kept level at all times.

Figure 2:
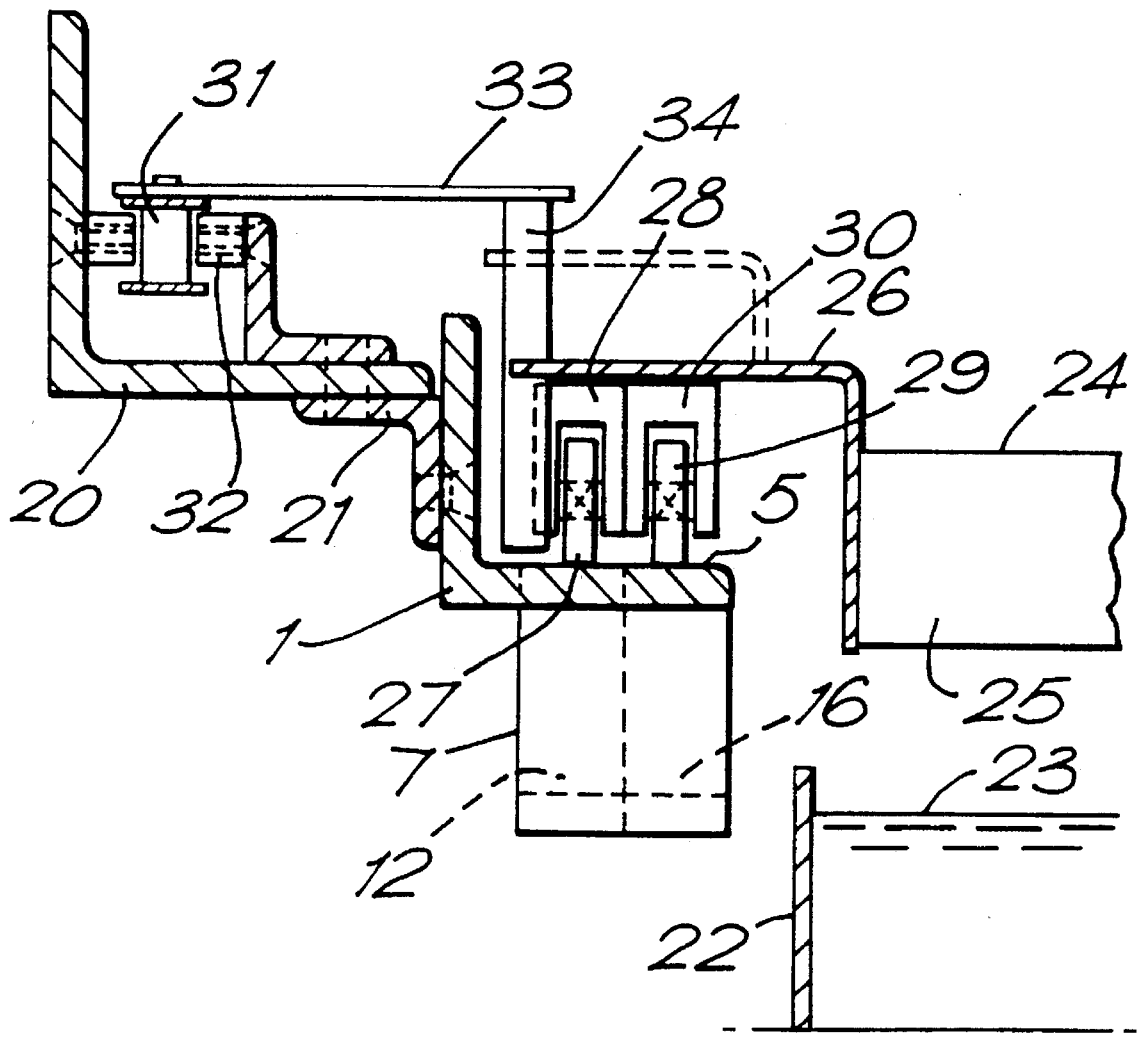
FIG. 2 is a transverse section through part of the apparatus.

Referring now to FIG. 2, the left hand side of a soldering apparatus is shown. The left hand track 1 is arranged horizontally, being mounted on a frame 20 by means of an angle piece 21. The track 1 runs along the side of a solder bath 22 containing solder with a level surface 23. Above the bath 22 is provided a carrier 24 for components, for example of the type shown in the Tee U.S. Pat. No. 4,677,937. The carrier 24 has a central region 25 containing components mounted on tracks with their leads pointing downwardly, and a support 26 on its left hand side. Underneath this support is mounted a leading follower in the form of a rotatable wheel 27 in a bearing block 28, on the outside of the support 20. Also provided is a trailing follower in the form of a rotatable wheel 29 in a bearing block 30, on the inside of the support 26. Wheels 27 and 29 run along the surface 5 of track 1. However, wheel 27 is arranged to follow the profile in region 12 of block 7, and wheel 29 is arranged to follow the profile in region 16 of block 7. As will be appreciated, leading block 28 and wheel 27 are provided at the front of the carrier 24, and the inwardly spaced trailing block 30 and wheel 29 are provided at the rear of the carrier 24.

As the wheels 27 and 29 move along track 1 and follow their respective profiles in regions 12 and 16, the carrier 24 is maintained in a horizontal orientation but is dipped into the solder for an amount sufficient to coat required parts of components and is then lifted clear again.

Movement of the carrier 24 is effected by means of a chain conveyor mounted on frame 20, including chain links 31 which pass through a chain guide 32, around an idler sprocket (not shown) and around a drive sprocket driven by an electric motor (not shown). The speed of the drive can be adjusted. On the chain conveyor are provided arms 33 with depending fingers 34, one or more of which engages the support 26 of carrier 24, for example by being received in a slot in the left hand edge of the support. The depth of the finger 34 is such as to maintain engagement with the support 26 as the carrier 24 is lowered and raised. A number of carriers will normally be processed in series, each being moved by a respective one of the longitudinally spaced fingers 34.

The right hand side of the apparatus, using track 2, corresponds exactly with the exception that it may not be necessary to provide a second drive mechanism. It might be desirable, in the absence of a second drive mechanism (which would normally be linked to or otherwise coordinated with the first), to provide a guide to assist in directing the carrier in a straight line down the track.

The particular arrangement described and illustrated has many advantages which will also apply to other systems employing at least some of the novel features and concepts disclosed. The apparatus has great flexibility and can be used to solder all types of semiconductor leads from the smallest SOIC's to long lead components and power transistors. The system, involving longitudinal movement and vertical dipping while retaining a horizontal orientation, is extremely flexible while giving good results. Because constant movement can be maintained, output can be increased to levels at least as good as those achieved with wave soldering and better than those achieved with static dipping. Dross formation can be reduced as compared to wave soldering systems.

It will be appreciated that the present disclosure embodies many inventive features and also that variations and modifications may be made while still retaining at least some of the advantages referred to. The invention also extends to a process of coating components using the system of maintaining horizontal orientation and to components so coated. Furthermore, the solder bath may be replaced by a bath or other fluid such as flux or indeed any other fluid in general applications.

I claim:

1. Apparatus for applying a coating of solder to downwardly extending leads of electronic components comprising:

a) solder bath containing molten solder with a level surface;

b) track means including laterally spaced apart guide tracks;

c) carrier means removably supporting the electronic components thereon such that leads of the electronic components extend downwardly, the carrier means having a first follower on a leading portion of the carrier for movably supporting a leading portion of the carrier on the guide tracks, a second follower on a trailing portion of the carrier longitudinally spaced from the first follower for movably supporting a trailing portion of the carrier on the guide tracks, the first and second followers being laterally offset from each other;

d) blocks releasably attached to the guide tracks adjacent to the solder bath and defining
   i) a first profiled region for guiding the first follower towards and away from the level surface of the solder bath as the carrier moves along the track means; and,
   ii) a second profiled region longitudinally spaced from the first profiled region for simultaneously guiding the second follower towards and away the level surface of the solder bath as the carrier moves along the track means, the first and second profiled regions being laterally offset from each other such that the first follower bypasses the second profiled region and the second follower bypasses the first profiled region, the longitudinal spacing between the first and second profiled regions being substantially the same as the longitudinal spacing between the first and second followers such that the carrier maintains its orientation as it moves towards and away from the level surface of the solder bath.

2. The apparatus of claim 1 wherein the track means comprises a pair of laterally spaced apart guide tracks.

3. The apparatus of claim 2 wherein a block is releasably attached to each guide track.

4. The apparatus of claim 3 wherein each block defines a first profiled region and a second profiled region.

5. Apparatus for applying a coating of solder to downwardly extending leads of electronic integrated circuit packs, comprising: a horizontally oriented carrier having a plurality of tracks each adapted to removably receive therein electronic integrated circuit packs with their leads pointing downwards; a soldering bath containing molten solder with a level surface; a guide track for guiding the carrier across the solder bath, a first follower for supporting a leading portion of the carried on the guide track; a second follower longitudinally spaced form the first follower for supporting a trailing portion of the carrier on the guide track; and means for urging the carrier along the guide track; wherein the guide track has a first profiled region for guiding the first follower down towards the level surface of the solder and a second profiled region longitudinally spaced from the first region for simultaneously guiding the second follower down towards the level surface of the solder, the first and second profiled regions of the guide track being laterally offset from each other, the guide track having a cut-out with a block located releasably therein, the block having the first and second profiled regions of the guide track defined thereon, and wherein the first and second followers for supporting the leading and trailing portions of the carrier are likewise laterally offset from each other so that when the carrier is urged along the guide track the first follower bypasses the second profiled region and the second follower bypasses the first profiled region, wherein profiles of the first and second profiled regions are substantially the same and the longitudinal spacing Of the profiled regions from each other is substantially the same as the longitudinal spacing of the first and second followers from each other, so that when the carrier is urged along the guide track it maintains its horizontal orientation at the same time as it moves vertically towards and away from the level surface of the solder so as to dip the leads of the electronic integrated circuit packs in the solder.

6. Apparatus as claimed in claim 5, wherein a guide track is provided on each side of the solder bath.

7. Apparatus as claimed in claim 5, wherein each profiled region consists of a downwardly inclined region, a horizontal region and an upwardly inclined region.

8. Apparatus as claimed in claim 5, wherein the means for urging the carrier along the guide track comprises a chain conveyor with a plurality of fingers for engagement with the carrier.

9. Apparatus as claimed in claim 5, wherein each of the profiled regions is replaceable.

* * * * *